(12) United States Patent
Athavale et al.

(10) Patent No.: US 9,241,124 B2
(45) Date of Patent: Jan. 19, 2016

(54) CONTENT GENERATION FOR INTERACTIVE VIDEO PROJECTION SYSTEMS

(71) Applicants: Meghan Jennifer Athavale, Winnipeg (CA); Keith Martin Otto, Winnipeg (CA); Curtis Franz Wachs, Winnipeg (CA)

(72) Inventors: Meghan Jennifer Athavale, Winnipeg (CA); Keith Martin Otto, Winnipeg (CA); Curtis Franz Wachs, Winnipeg (CA)

(73) Assignee: Lumo Play, Inc., San Francisco, CA (US)

( * ) Notice: Subject to any disclaimer, the term of this patent is extended or adjusted under 35 U.S.C. 154(b) by 0 days.

(21) Appl. No.: 14/267,410

(22) Filed: May 1, 2014

(65) Prior Publication Data

US 2014/0327610 A1    Nov. 6, 2014

Related U.S. Application Data

(60) Provisional application No. 61/817,973, filed on May 1, 2013, provisional application No. 61/869,272, filed on Aug. 23, 2013, provisional application No. 61/968,068, filed on Mar. 20, 2014.

(51) Int. Cl.
| | |
|---|---|
| *G06F 3/01* | (2006.01) |
| *H04N 5/74* | (2006.01) |
| *H04N 5/225* | (2006.01) |

(Continued)

(52) U.S. Cl.
CPC ............. *H04N 5/7475* (2013.01); *G06F 3/011* (2013.01); *G06F 3/017* (2013.01); *G06F 3/0304* (2013.01); *H04N 5/2252* (2013.01); *H04N 5/33* (2013.01); *G06F 2203/01* (2013.01)

(58) Field of Classification Search
CPC ..... G06F 3/017; G06F 2203/01; G06F 3/011; H04N 5/7475; H04N 5/2252; H04N 5/33
See application file for complete search history.

(56) References Cited

U.S. PATENT DOCUMENTS

| | | | |
|---|---|---|---|
| 8,363,716 B2 * | 1/2013 | Kalva et al. .............. | 375/240.01 |
| 2001/0012001 A1 | 8/2001 | Rekimoto et al. | |
| 2007/0291233 A1 | 12/2007 | Culbertson et al. | |

(Continued)

FOREIGN PATENT DOCUMENTS

| | | |
|---|---|---|
| WO | WO-2008052280 A1 | 5/2008 |
| WO | WO-2014176682 A1 | 11/2014 |
| WO | WO-2015036852 A2 | 3/2015 |

OTHER PUBLICATIONS

"International Application Serial No. PCT/CA2014/000394, International Search Report mailed Aug. 7, 2014", 3 pgs.

(Continued)

*Primary Examiner* — Abbas Abdulselam
(74) *Attorney, Agent, or Firm* — Schwegman Lundberg & Woessner, P.A.

(57) ABSTRACT

Various embodiments herein include systems, methods, and software for interactive video projection system content generation. Such content is content consumed by a system that projects a scene view on a surface, such as a wall, screen, or floor, and is interactive with user motion. User motion is captured as input via a camera or other imaging device and processed on a computing device to determine where in a projected scene a user is moving. The scene is then modified based on the detected motion. A user generates content for consumption in such embodiments by providing image and variable input to populate a graphical rendering template when rendered for presentation to a user.

20 Claims, 9 Drawing Sheets

(51) Int. Cl.
*H04N 5/33* (2006.01)
*G06F 3/03* (2006.01)

(56) References Cited

U.S. PATENT DOCUMENTS

| | | |
|---|---|---|
| 2008/0028325 A1 | 1/2008 | Ferren et al. |
| 2010/0066675 A1 | 3/2010 | Wilson et al. |
| 2010/0103385 A1 | 4/2010 | Kubota |
| 2011/0288964 A1 | 11/2011 | Linder et al. |
| 2013/0086533 A1 | 4/2013 | Stienstra |
| 2013/0111549 A1* | 5/2013 | Sowatskey et al. ............. 726/3 |
| 2015/0054963 A1 | 2/2015 | Athavale et al. |

OTHER PUBLICATIONS

"International Application Serial No. PCT/CA2014/000394, Written Opinion mailed Aug. 7, 2014", 5 pgs.

"International Application Serial No. PCT/IB2014/001838, International Search Report mailed May 18, 2015", 2 pgs.

"International Application Serial No. PCT/IB2014/001838, Written Opinion mailed May 18, 2015", 12 pgs.

"International Serial No. PCT/CA2014/000394, Notification Concerning Transmittal of International Preliminar Report on Patentability—mailed Nov. 12, 2015", 1 pg.

"International Serial No. PCT/CA2014/000394, International Preliminary Report on Patentability mailed Nov. 3, 2015", 6 pgs.

* cited by examiner

CONTENT GENERATION FOR INTERACTIVE VIDEO PROJECTION SYSTEMS

CROSS-REFERENCE TO RELATED APPLICATION

This application is related to U.S. Provisional Application Ser. No. 61/817,973, filed on May 1, 2013, to U.S. Provisional Application Ser. No. 61/869,272, filed on Aug. 23, 2013, and to U.S. Provisional Application Ser. No. 61/968,068, filed on Mar. 20, 2014, to each of which priority is claimed and are incorporated herein by reference in their entireties.

FIELD OF THE INVENTION

Embodiments herein relate to interactive video projection systems, in particular content generation for interactive video projection systems.

BACKGROUND

Interactive display surfaces are used in various forms for entertainment, promotion, education, and the like. A typical interactive display surface generally comprises a graphical display such as a video screen to display a graphical image or a surface onto which the graphical image may be projected for display to users within an adjacent environment, together with a system for detecting motion of the users within the adjacent environment. The motion detecting system typically relies on a camera directed towards the adjacent environment and a motion-detecting algorithm. The motion-detecting algorithm analyzes the data captured by the camera to determine what type of motion has occurred. The graphical image can then be varied according to various characteristics of the detected motion. For example, an object displayed in the graphical image may be displaced or varied in size, color, or configuration, etc. according to the location or amount of motion detected. The configuration of a graphical display, motion detecting system, and computing device running the motion-detecting algorithm can be quite complex, requiring custom configuration and installation by skilled individuals. Additionally, content consumed within such systems can be quite complex requiring custom programming by specially skilled individuals.

DETAILED DESCRIPTION

Figure 1:
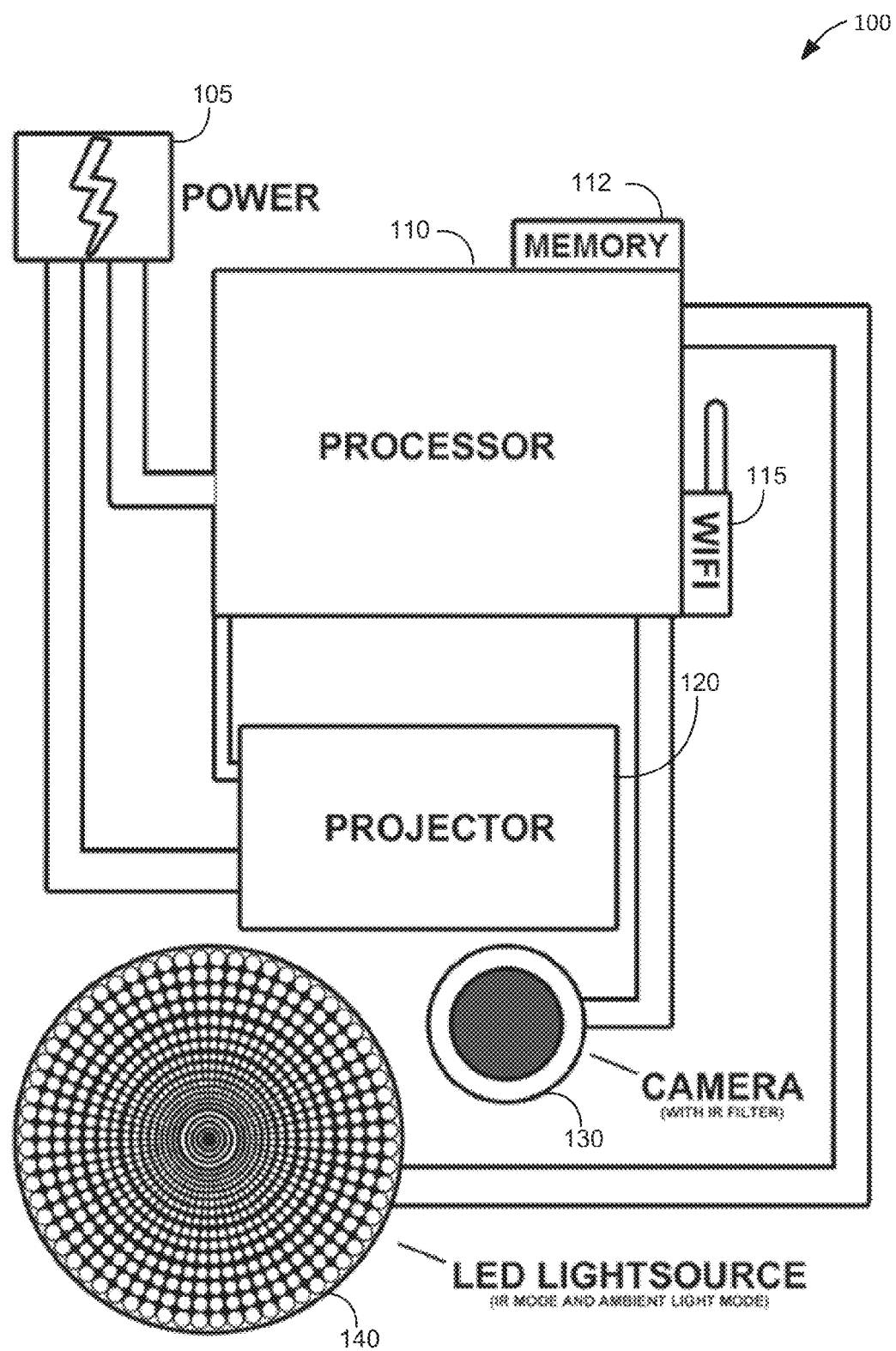
FIG. 1 is a block diagram of the general hardware components of a motion interactive video projection system, according to an embodiment.

Various embodiments herein include systems, methods, and software for simplified motion interactive video system content generation. Such content is content consumed by a system that projects a scene view on a surface, such as a wall, screen, or floor, and is interactive with user motion, objects present within a scene, and the like. User motion is captured as input via a camera and processed on a computing device to determine where in a projected scene a user is moving. Objects present within a scene may be marked to assist in recognition thereof, such as by reflective markings thereon. In some embodiments, the scene may be a sports game projected on a floor, such as a hockey game. A user can move around the scene to interact with the projected game, such as to move a hockey puck. The scene, which includes underlying code, receives input based on the sensed user motion and modifies the projected game view based thereon. In these and other embodiments, specific objects or individuals may be of known shapes or marked with specific indicators identifying specific known objects or individuals that can be processed to generate or configure content for presentation, such as an arrangement of objects that identify where content is either to be or not to be projected or to aid in identification of which individual is interacting in certain ways with a motion interactive video system.

Such content is generally difficult to generate. Various embodiments herein include graphical rendering templates that can be augmented through simplified user input to populate template variables. Such variables may include one or more images, such as an image of a playing surface (i.e., hockey rink, football field, background image, etc.), a logo, a building, and the like. Other variables may include an aspect ratio (e.g., 16×9, 4×3, etc.) at which content is to be projected, a shape of a projection space (e.g., rectangular, square, round, oval, star, etc.), a projection resolution, different elements specific to the particular template, such as wind speed when a template superimposes weather on to a background image, brightness, blur effects, contrast, and other interactive and image effects. Additional variables may include variables related to a number of motion interactive video projection systems that will be utilized in projecting content being created or customized, such as two or more of such systems that may operate in concert to project content that are user and object interactive. Such variables may include not only the number of number of motion interactive video projection systems to be utilized but also variables related to how content is to be divided, edge-blended on seems between projections, whether one of the motion interactive video projection systems will operate as a master and one or more others to operate as slaves, and the like. Some embodiments may also include variables with regard to a projecting an entire image or certain graphical or textual elements therein in two or three dimensions.

Based on the variable input, which may be received via a web page, client-based software application, mobile device app, or other client or cloud-hosted software, a preview may be presented. The preview, in some embodiments, may include a graphical rendering template, such as a SWF file renderable within the Adobe® Flash® Player available from Adobe Systems Incorporated of San Jose, Calif. or a file-type renderable within a Unity player available from, or created based on software available from, Unity Technologies of San Francisco, Calif. The graphical rendering template is graphical content that includes executable or scripting code elements to present an interactive graphical rendering. The graphical template is therefore renderable, such as a SWF file that is renderable within the Adobe® Flash® Player, a .UNITY renderable within a Unity player such as the downloadable Unity web player. The graphical rendering template file includes variables that correspond to the variable input received from the user. Thus, as the graphical rendering template file is rendered, the variable data will cause the rendering of the graphical rendering template file to be customized accordingly. The preview, in some embodiments, will be interactive based on received user input, such as via a mouse, touchpad, touchscreen, and the like. The user may then save or publish the preview.

When the preview is published, the graphical rendering template is augmented with additional data. The additional data, in some embodiments, includes image files and data representative of other variables received as input. The preview is bundled into one file or a set of files, such as a .UNITY file, .APK file, .SWF file, or custom file-type that is renderable within a player present on a computing device that will perform rendering based on the one or more files or as may be included within the file or files themselves. All or a portion of the published file(s) may be encrypted.

For example, in some embodiments, the published file(s) are consumable by a motion interactive video system program. Such a program generates graphical output based on the graphical rendering template file, image file(s), and other variables. The graphical output is projected on a surface (i.e., wall, screen, floor, etc.) and a user can interact therewith by moving in relation to a scene of the graphical output or placing objects in an area of the projected surface. User motion is captured via a camera and processed. Similarly, objects present in the area of the projected surface may be recognized by processing of the images or video captured by the camera based on known markings on or shapes of the objects or individuals. The graphical output is then modified based on one or both of motion detection and object and individual recognition in accordance with code or script elements of the graphical rendering template file and variables included in the published file(s), which may also be processed in view of additional system variables or configurations as described further herein.

The motion interactive video projection systems, in various embodiments, include systems, methods, and software that operate with regard to content, such as may be created and customized as described above to project an interactive surface on a wall, screen, floor, or other surface. The motion interactive video projection systems of such embodiments may be ceiling or wall mounted, placed or mounted on a horizontal surface such as a floor or table, mounted on a stand, or otherwise be placed in an environment to project on a horizontal surface, a vertical surface, both horizontal and vertical surfaces simultaneously or alternatively.

FIG. 1 is a block diagram of general hardware components 100 of a motion interactive video projection system, according to an embodiment. The hardware components 100 may receive power from conventional power source, such as an outlet, ceiling light fixture electrical power lines or power sockets such as Edison-style connectors, one or more batteries, among other power sources. The hardware components may include a power inverter 105. The hardware components 100 include a microcomputer processor 110, a projector 120, an image-capturing device 130, and a light source 140.

Figure 2:
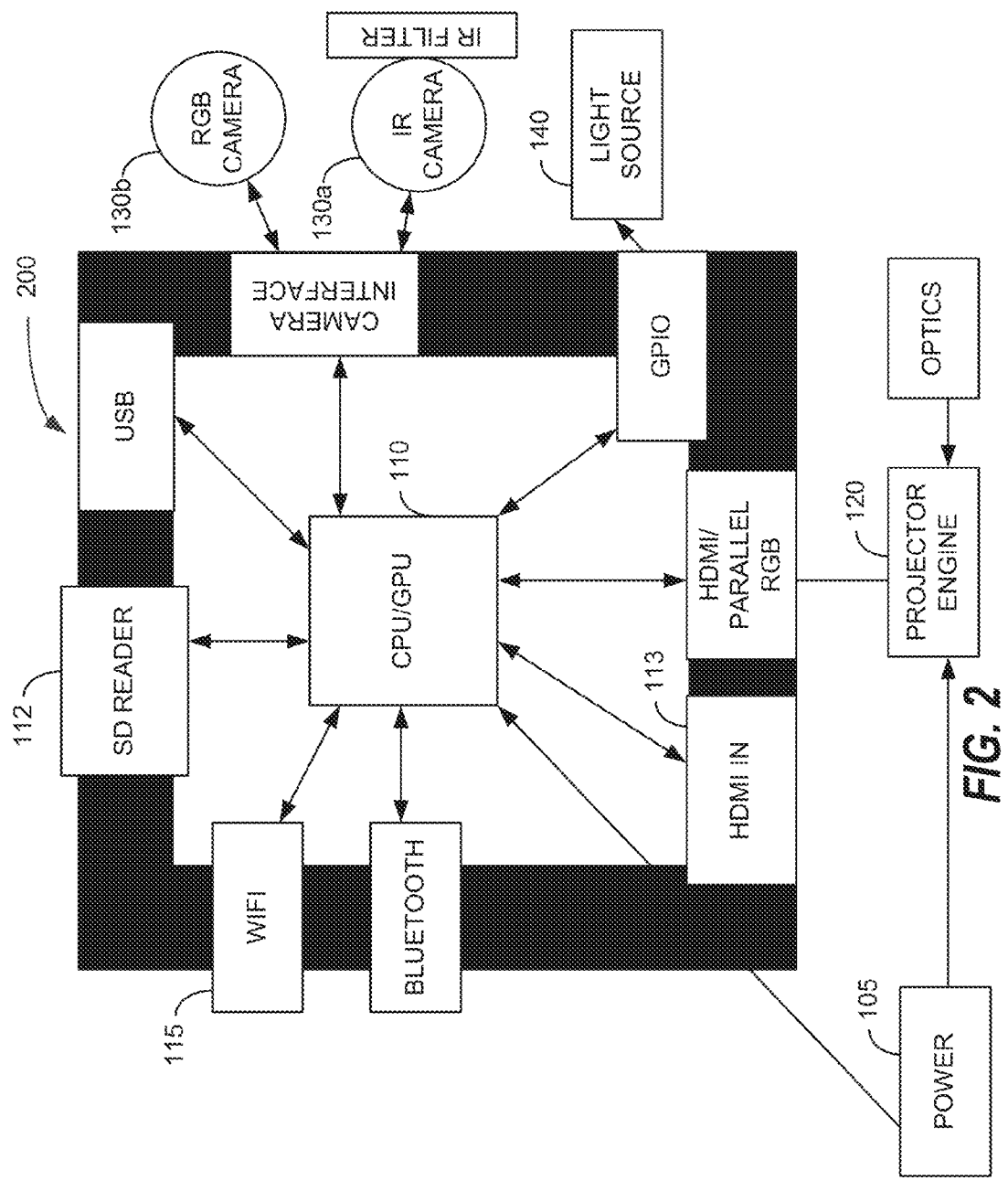
FIG. 2 is a block diagram of specific hardware components of a motion interactive video projection system, according to an embodiment.

FIG. 2 is a block diagram of specific hardware components 200 of a motion interactive video projection system, according to an embodiment. The hardware components 200 may receive power from conventional power source as discussed above with regard to FIG. 1, and may use a power inverter 105. The hardware components 100 include a microcomputer processor 110, a projector 120, an IR image-capturing device 130a, an RGB image-capturing 130b device, and a light source 140.

One or more peripheral or integrated wireless communication devices may be present in some embodiments and be used in conjunction with the hardware components 100. For example, a peripheral Wi-Fi® or Bluetooth® adapter may be connected to the hardware components 100 through an external Universal Serial Bus (USB) port or other communication port or integrated within an integrated circuit board of the hardware components 200. Alternatively, the microcomputer processor 110 may include an integrated wireless communication adapter 115, or a separate wireless communication adapter 115 may be attached directly to the microcomputer processor 110 or to a bus to which the microprocessor is also attached. The wireless communication devices may be used to connect the microcomputer processor 110 to the Internet or other network, or the wireless communication devices may be used as an input device to cause various actions to be executed by the microcomputer processor 110.

The image-capturing device 130 may be in the form of a camera arranged to capture video images of the users and objects in the environment adjacent or within the output display area to which the graphical display image is displayed. In further instances, the image-capturing device 130 may be arranged to capture video of any object, moving or stationary, within a target area. In either instance, the video captured comprises a sequence of frames in which each frame is comprised of a two dimensional array of pixels.

The image-capturing device 130a may include a lens that may also have an integrated or attached infrared (IR) filter. The image-capturing device 130a may include an IR light source, an IR light source may be included within the light source 140, or an IR light source may be connected as a peripheral device. The IR light source may project IR light into the target area or surrounding environment adjacent the output display area, for example in a grid pattern. The lens may capture the infrared light reflected back from objects in the target area, filtering out light other than IR light, such that interactive software (e.g., software such as provided by Po-Motion Interactive Software) can use the microcomputer processor 110 to analyze the captured array and define a shape of objects, in either a two-dimensional (2-D) or three-dimensional (3-D) manner, within the target environment by studying how the grid pattern of projected IR light is altered in its reflective state as captured by the lens. The light source may produce ambient or directional IR light of a specific wavelength which will be captured by a lens which is filtered to allow only that wavelength of IR light to be detected by the camera. The lens may be arranged to capture video frames at a predetermined depth of field. The video frames may be comprised of pixels, and the predetermined depth of field may enable the microcomputer processor 110 to interpret each pixel as a distance on a projected interactive display. For example, the following configuration would result in one pixel per inch: the depth of field is selected so that only objects approximately ten feet away are in focus, the interactive display projects a ten foot square projection from a height of ten feet, and the captured image is one hundred and twenty pixels square.

The image-capturing device 130a may include one or more components that enable sensing of 3-D depth, motion, or presence of an object or person. Sensing 3-D depth, motion, or presence may be enabled by augmenting 2-D sensing with a depth sensor to capture motion perpendicular to the image-capturing device 130, such as with sonic or laser range detection. Sensing 3-D depth or motion may also be enabled using stereoscopic vision, such as by using two or more cameras within the image-capturing device 130. Sensing 3-D depth or motion may also be enabled using motion parallax, such as by moving a single camera to capture images from two different angles. Sensing 3-D depth or presence may allow the microcomputer processor 110 to determine when objects are covering a room's floor, such as might be used as a "messy meter" that prevents interactive device operation until the room floor has been cleaned. 3-D depth may also be used to track a child's height or other person's height to determine growth, or may be used to track level of movement to collect health and activity statistics. Sensing 3-D depth, motion, or presence may be used to enable accurate projection of images onto stationary or mobile surfaces, people, toys, or other objects, where the projection of images may be used, for example, to turn a white box into a spaceship, to project colors on people, or to project other interactive and transformative effects. Such modes of depth and motion detection, both 3-D and 2-D, may be used in some embodiments for automated calibration of the hardware components 100 and software that executes thereon.

The light source 140 may include an integrated infrared (IR) light source and an integrated ambient light source, or an integrated infrared (IR) light source or integrated ambient light source may be connected as a peripheral device. The ambient light source may include an LED light source, an incandescent light source, or another ambient light source. The light source 140 may include a dimmer feature for the integrated ambient light source, where the dimmer feature may accept a lower voltage or current and provide a reduced amount of ambient light. The IR light source may include an LED light source or a laser IR light source. In some embodiments, the light source may be or include an external light source, such as may be wirelessly instructed to turn on, adjust brightness, adjust a pattern or number of lights that are turned on or off, and the like.

The microcomputer processor 110 may be a standalone processor, or may be a personal computer or laptop having a processor therein to be arranged to execute various algorithms stored on memory 112 in the form of software. Among the algorithms are one or more motion-detecting algorithms that receive the imaging data from the image-capturing device 130 and compares adjacent frames of video in the sequence according to prescribed criteria. In some embodiments, each frame may be received in multiple forms, such as when the image-capturing device 130 includes High-Dynamic Range (HDR) imaging functionality. The frame comparison may determine where motion occurs within each frame, and may determine how much motion is occurring at any given time. The motion-detecting algorithm may be configured to detect motion for each frame relative to a previous frame in real time as the video is captured. In other embodiments, a motion detection algorithm may be configured to detect motion between every two frames, three frames, or other number of frames as may be desired or set according to a desired resolution of motion detection, as can be satisfactorily processed by available computing resources, and the like. In other embodiments, rather than throttling a motion detection algorithm to scale processing to available computing resources, a frame capture rate of the image capture device may be modified. Additionally, the motion detection algorithm may further determine settings for the image-capturing device 130 based on the received images, such as a contrast setting, a gain or brightness setting, a frame capture rate, lighting parameters, and the like.

As noted above, there may be one or more motion detection algorithms present in various embodiments. When more than one motion detection algorithm is present in an embodiment, each motion detection algorithm may be tailored to detecting certain motion types. For example, certain types of motion detection may be easier or less data processing intensive others. For example, one motion detection algorithm may be tailored to detecting motion from user extremities while another motion detection algorithm may be tailored to detecting a single largest location of motion. Other algorithms may be tailored to other purposes such as detecting motion with regard to specific images or content, such as an image of a keyboard that may be utilized to type. Regardless, a user may be presented with an option to choose one or more motion detection algorithms or a content developer may specify a motion sensing algorithm to be utilized with an element of content, such as a particular game.

The microcomputer processor 110 may include or execute software of an image-generating algorithm that produces an interactive image to be displayed or projected on the output display area. More particularly, the image-generating algorithm may alter a graphical image being displayed in response to the motion detected within the video frames. The microcomputer processor 110 may generate the interactive projection component using interactive software installed or otherwise on the microcomputer processor 110 or within the motion interactive video projection system of FIG. 2. The interactive software may receive input from the motion detection algorithm and modify a projected image based thereon.

With regard to the motion sensing algorithm, conventional image processing (e.g., computer vision) can be processor-intensive and prone to errors. To improve reliability and processor efficiency, the motion detection algorithm, which is present within the motion interactive video projection system in the form of software or firmware as may be embedded in a dedicated chip or application specific integrated circuit, may use IR image processing. When the hardware components 100 are in interactive mode, the light source 140 may use the integrated IR light source to wash the projection area with IR light. The IR light is invisible to the naked eye, but the IR light allows the image-capturing device 130a with integrated IR filter, or otherwise with IR sensing capability, to capture motion from users while ignoring other motion activity in the projection area. IR motion data from the image-capturing device 130a may be used by the microcomputer processor 110 to track user position and motion or the location of certain objects or individuals, known or otherwise. The motion data may be generated using a shape-detection algorithm. The shape-detection algorithm, in some embodiments, operates on changes from processed frame to processed frame using reflected IR light, and filters out any changes determined to be too small to represent an intentional motion by the user. The shape-detection algorithm provides information about the detected shapes to the interactive software. The interactive software interprets shape changes as motion, where the detected motion is processed to determine if the motion has triggered a "motion event."

In some embodiments, the microcomputer processor 110 may accept wireless signals from a remote control. The remote control may communicate via infrared (IR), Bluetooth®, Wi-Fi®, RF, or other communication methods. The remote control may be a dedicated remote control, similar to a TV remote, or the remote control may be a computing device running a remote control application, such as a smartphone or tablet device having a remote control app that executes thereon. Using the remote control, a user may turn the interactive projection effect and entertainment system of the hardware components 100 on or off, and may select between different modes of operation. The remote control may also select among available games, streaming internet channels or videos, interactive effects, and input sources (i.e., AV, HDMI, TV, digital TV, cable, digital cable, RGB, etc.) similar to switching through channels on a TV. As such, the hardware components 100 may also include one or more additional video inputs to enable connectivity with video sources, such as cable television, over-the-air television signals, set-top boxes, video playing devices, computers, and the like.

In some embodiments, the microcomputer processor 110 may execute entertainment content, such as one or more stored games, streaming media services (e.g., Netflix®, ChromeCast®, TheBlaze®), or interactive effects. This entertainment content may be installed on the memory 112 associated with the microcomputer processor 110, such as on a hard drive, removeably memory card (e.g., micro SD card, USB drive), random-access memory, flash memory, other type of memory storage, or streamed from a video source input such as HDMI® 113. The microcomputer processor 110 may also access the entertainment content through an application store. The application store may offer entertainment content for free, for a time-limited rental, for purchase, or through other contractual arrangements. The application store may be executed by the microcomputer processor 110, or may be executed on a separate computing device. For example, new entertainment content may be downloaded and managed from a website using a user's phone or laptop, and may be transferred to the memory 112 via a wired connection or wirelessly via the Wi-Fi® adapter 115. In another embodiment, purchased entertainment content may be stored on the internet (e.g., the "cloud"), and can be transferred to the microcomputer processor 110 on an on-demand basis. Although referred to as entertainment content, the entertainment content may instead be educational, informative, instructional, exemplary, and other forms of content.

The microcomputer processor 110 may interact with a graphical user interface displayed on a controller display area. The controller display area may be provided in the form of an auxiliary display separate from the primary display locating the output display area thereon. For example, the graphical user interface may be provided on the remote control, on a smartphone, on a computer, or on another device. The graphical user interface permits interaction with an operator of the system through a user input, where the user input is typically in the form of input controls on a computing device (i.e., keyboard, mouse, touchpad, touchscreen, microphone, video capture device, etc.). The graphical user interface allows the various criteria of the motion-detecting algorithm to be visually represented on the graphical user interface display area such that the user can readily adjust the criteria through the user input. The graphical user interface may also allow the user to adjust the sensitivity of the interactive video system to motion for calibrating the system to the surrounding environment. However, in other embodiments, the user interface may be presented by the hardware components as a projection from the projector 120 with which a user may interact and the user interactions captured by the image-capturing device 130 and motion detecting algorithm. The user interface may include selectable icons and menu items, a projected keyboard, and the like.

The microcomputer processor 110 may include a calibration function to calibrate the interactive projection with the image-capturing device 130. Calibration may correct or compensate for distortion or discontinuity caused by projecting entertainment content onto a surface that is not perpendicular to the projector 120 or image-capturing device 130*a* or 130*b*. Once calibrated, the microcomputer processor 110 may correctly process motion on the screen by identifying any area where movement is taking place and converting it to a "touch event," similar to how screen interactivity is achieved on a touchscreen. Calibration may be accomplished by aligning pattern or motion data from the image-capturing device 130 one or more objects or assets in the projection screen area. Calibration may be performed automatically by using a projected and captured pattern, or may be performed manually through a series of prompted user input events. For example, manual calibration may be accomplished by causing the projector 120 to project one or more calibration points, waiting for the user to touch each calibration point, and using the image-capturing device 130 to record the user motion.

In some embodiments, the calibration process allows for configuration of a plurality of motion interactive video projection systems that may be deployed in a single environment. The configuration process may allow for designating of a master motion interactive video projection system or otherwise designating how the motion interactive video projection systems will work together. Overlapping projection areas may be oriented and defined, brightness of each motion interactive video projection system adjusted to provide uniformity between projected images, and the like. Through use of multiple motion interactive video projection systems, large areas of one or more of walls, floors, and ceilings may be projected upon. In some embodiments, all perimeter surfaces of a room may be projected upon providing an immersive experience. In some embodiments, the immersive experience of a room may also be interactive, such as for game play, a faux environment such as an ocean, forest, jungle, recorded or simulated concert, and the like.

Once calibrated, the microcomputer processor 110 may cause the projector 120 to project an interactive environment. Various interactive environments may include educational environments for home or school. An application may include an interactive play mat for babies, where motion from the projection on the floor stimulates babies and encourages them to move and crawl. An application may include a physically engaging game for one or more children, encouraging children to jump, run, dance, move in order to trigger effects (e.g., make flowers bloom), or win a game (e.g., play soccer, Greedy Greedy Gators, and even interactive versions of well-known, branded games). An application may include a room decoration to help theme an environment (e.g., a front lobby installation). An application may include a resource for children with sensory, motor, or social difficulties, where the interactive responses from the floor may encourage children to explore different types of motion. Other applications may be marketing-oriented, such as an application that causes images of wall colors or pieces of furniture to be projected into an environment to allow a consumer a preview of how the wall color may look or how a piece of furniture may fit or look within the environment, and as may be modified based on color, upholstery, and other options of a piece of furniture. In some embodiments, the calibration functions described above and the 2-D and 3-D motion sensing algorithms may provide data to such a furniture previewing application to facilitate a properly scaled 2-D projection of a piece of furniture to be projected.

Various interactive environments may include games for home or school. Motion events in gameplay can be used in various games. A motion event may include a user limb movement that may be interpreted as kicking a ball or hockey puck around to score goals against an opponent. A motion event may include jumping, where the jumping event causes an animation to occur or react in a different way. A motion event may include running, where the running may trigger lighting effects. A motion event may include waving, where the waving may be used to herd or corral animals.

In some embodiments, the hardware components 100 may include a motorized mount. The motorized mount may be a moveable mirror configured to redirect the light from the projected interactive environment, or may be a mechanism that reorients the projector 120 or one or more of the other hardware components 100. The motorized mount may be used to select between a wall display of a movie and a floor or wall display of an interactive game. The motorized mount may be used within a video conference to redirect the projector 120 or the image-capturing device 130. The motorized mount may be used to display and interact with the interactive environment using one or many physical objects, such as using a toy to interact with an animated character. The motorized mount may be used to generate a 3-D map of objects, such as by orienting the projector 120 and image-capturing device 130 at furniture, people, or other objects within a room. The motorized mount may also be used to reorient the projected interactive environment to the ceiling, such as for ambience, relaxation, comforting nightlight, or constellation simulations.

The hardware components 100 may also include one or both of one or more speakers and one or more microphones. The speakers may be used to project sound effects, music, web conference or video call audio, or an audio notification such as an alarm. When the user is using a multiplayer interactive environment, the speakers may project sounds from remote players. The microphones may be used to provide voice commands or voice recognition. The speakers and microphones may be used together to provide audio interaction, such as in videoconferencing or audibly interacting with an animated character. In some embodiments, audio may be output from the hardware components for use as input by an external audio system. Such audio output may be provided via a wireless signal to a receiver connected to the external audio system or via convention audio output connections, such as digital optical connections and analog electrical connections.

Figure 3:
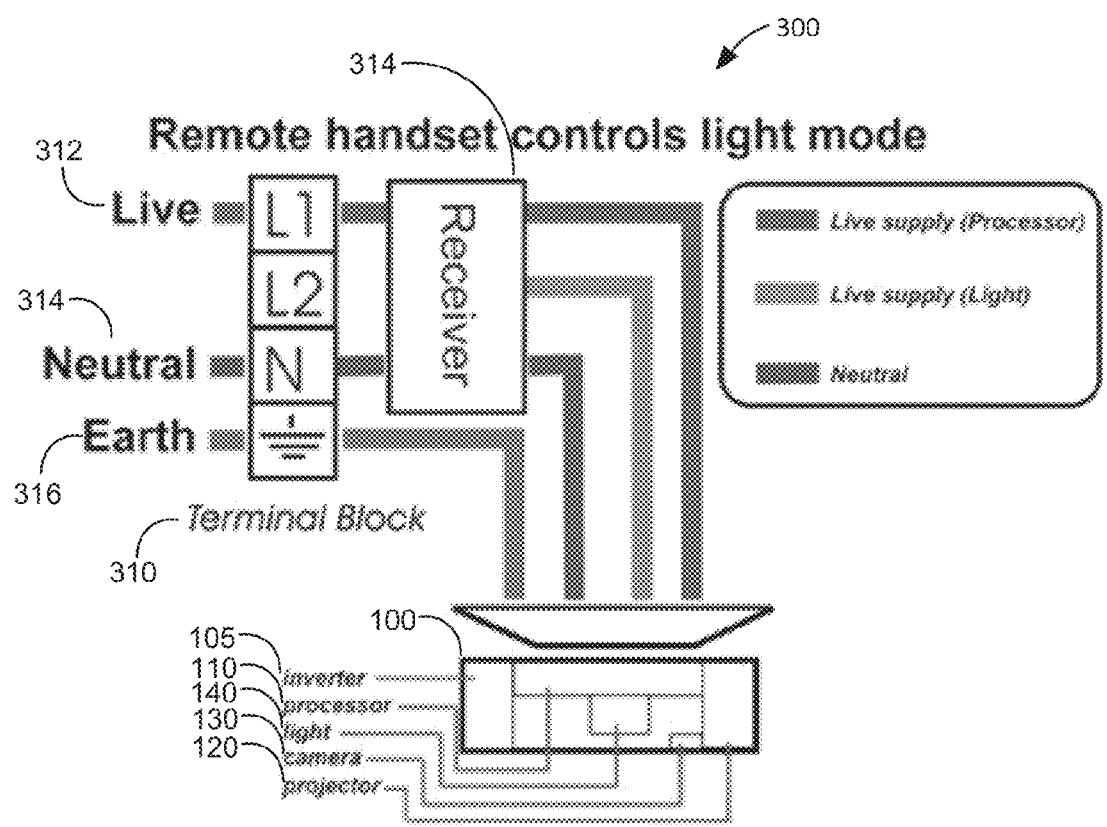
FIG. 3 is a block diagram of components involved in installation of motion interactive video projection system, according to an embodiment.

FIG. 3 is a block diagram of installation components 300 of a motion interactive video projection system, according to an embodiment. In an embodiment, the installation components 300 may be installed on the ceiling of a room, facing down. This installation may be achieved in the same way a standard ceiling light fixture is installed, and may allow a standard ceiling light fixture to be replaced with the installation components 300. However, in other embodiments, the installation components may be mounted on a stand, ceiling, or wall, or placed on a horizontal surface.

The installation components 300 may include a terminal block 310, a remote control receiver 320, and interactive display hardware components 100. As described above, the hardware components 100 may include a power inverter 105, a microcomputer processor 110, a projector 120, an image-capturing device 130, and a light source 140. The terminal block 310 may include a terminal to connect to the live power circuit conductor 312, a terminal to connect to neutral circuit conductor 314, and a terminal to connect to the earth (e.g., ground) circuit conductor 316. The live power terminal 312 and neutral terminal 314 are connected to the remote control receiver 320. Using a remote control, the user may cause the remote control receiver 320 to provide power either to the conventional light source 140 or to the microcomputer processor 110, projector 120, and image-capturing device 130. The remote control may also be used to cause the remote control receiver 320 to provide a reduced voltage or power to the conventional light source 140, thereby dimming the ambient light emitted from the conventional light source 140.

Installation components 300 may be configured to allow a standard ceiling light fixture to be replaced with the installation components 300, though additional installation options may be available. For example, the interactive system may be powered by one or a combination of a hardwired solution, a cord solution, a battery, and a backup battery. A hardwired solution may be configured as described above, may be wired into an existing light fixture, for example using an Edison-style connector, or standardized outlet plug. The hardwired solution may also be configured to connect to a home automation system. The home automation system may provide power and various home automation functions, such as closing window blinds when the projector is turned on. The cord solution may plug into a standard North American or other wall outlet, depending on geography of the installation location, and may include an adapter for other wall outlets, voltage levels, or current levels. The battery solution may be rechargeable, and may charge from the household power supply.

Figure 4:
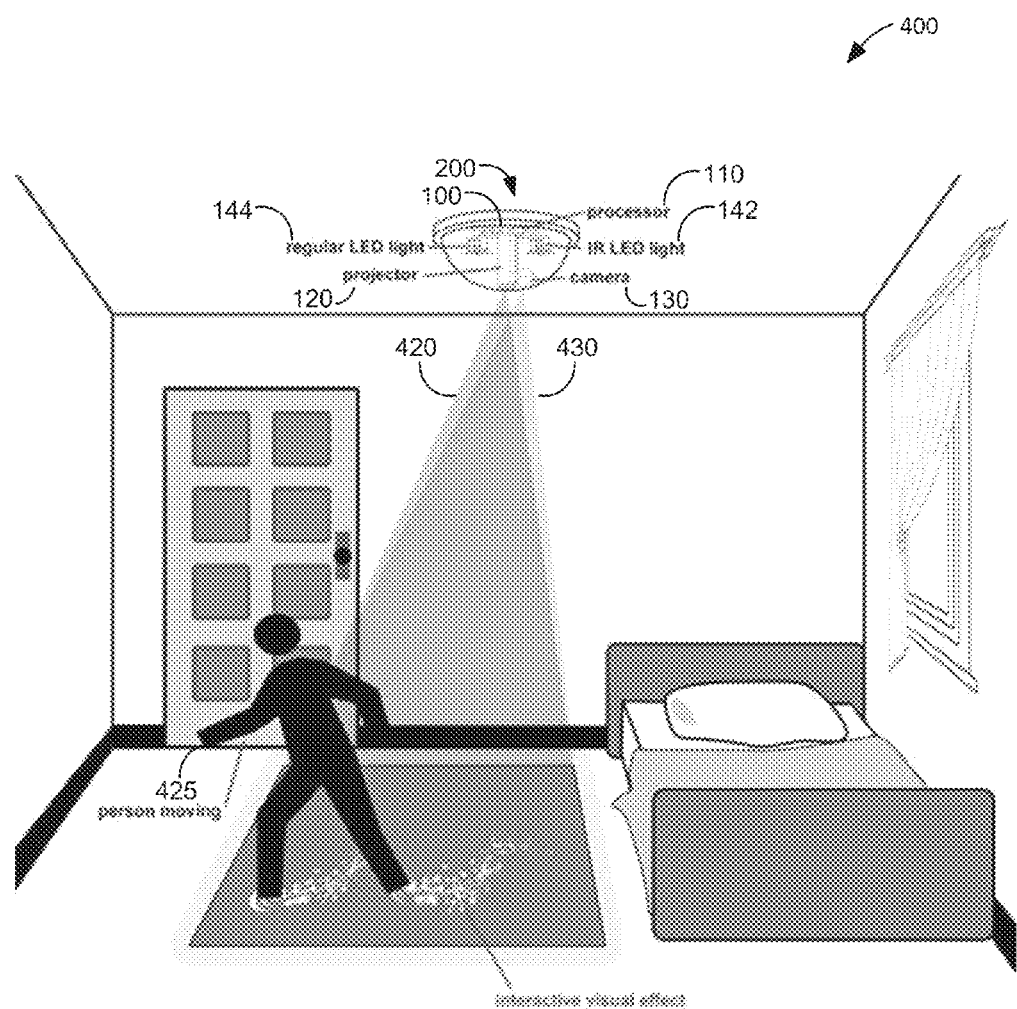
FIG. 4 is a representation of positioning and use of a motion interactive video projection system, according to an embodiment.

FIG. 4 is a representation of the positioning and functionality 400 of a motion interactive video projection system, according to an embodiment. In an embodiment, the installation components 300 may be positioned on the ceiling of a room, facing down. The installation components 300 may include the hardware components 100, which may include a microcomputer processor 110, a projector 120, an image-capturing device 130, and a light source 140. The light source 140 may include an integrated infrared (IR) light source and an integrated ambient light source, or an independent infrared (IR) light source 142 and an independent ambient light source 144 may be used.

The microcomputer processor 110 may generate the interactive projection component, and may cause the projector 120 to project an interactive scene 420 onto the floor of the room. The user 425 may move within the interactive scene 420, and the image-capturing device 130 may capture the user's movements within the camera field of view 430. The interactive software may receive input camera frames from within the camera field of view 430 and process the input camera frames to generate motion data. The motion data may be used by the interactive software to allow the user to interact with various education or gaming interactive environments.

Figure 5A:
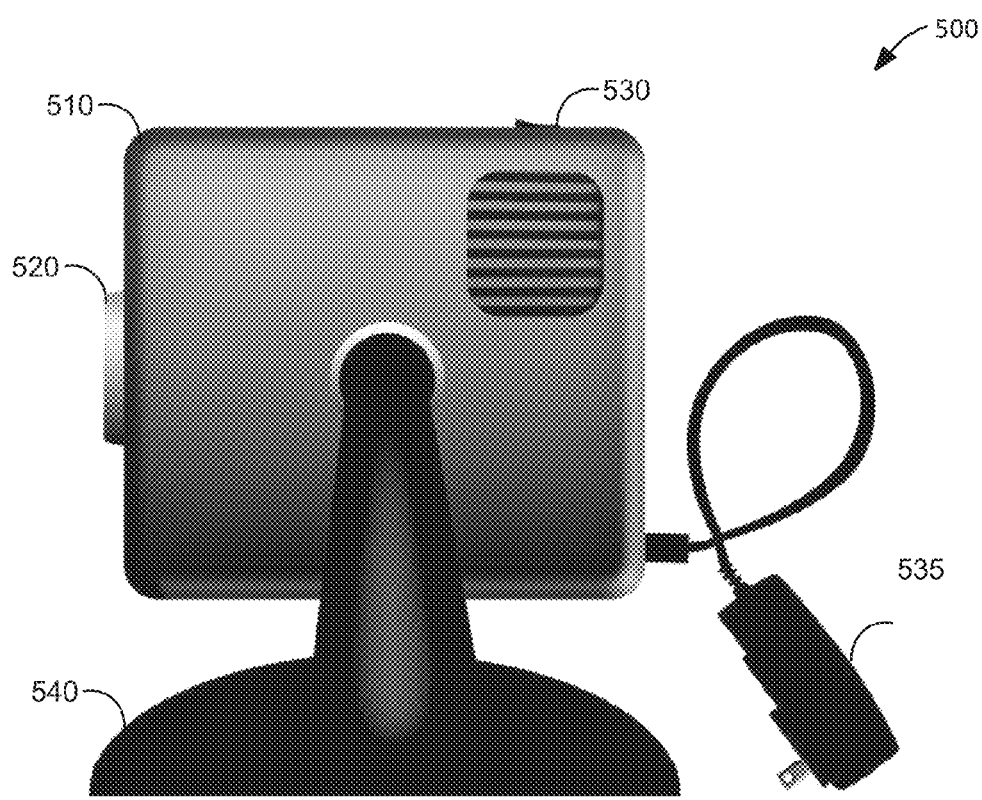
FIGS. 5A and 5B are side and front views of a motion interactive video projection system, according to an embodiment.
Figure 5B:
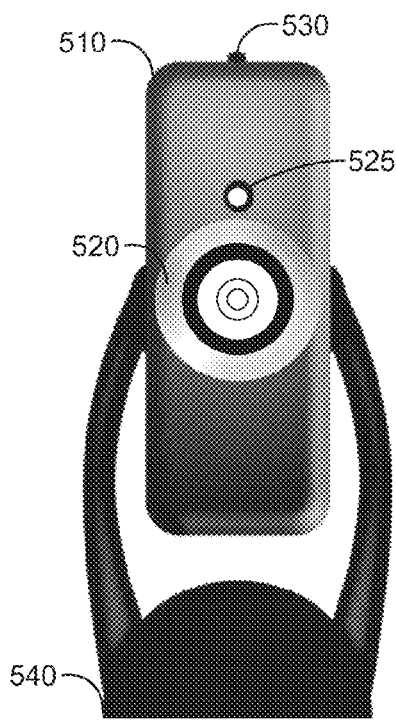

FIGS. 5A and 5B are side and front views of a motion interactive video projection system 500, according to an example embodiment. The motion interactive video projection system 500 may be used as an alternative to or in addition to a standard ceiling light fixture that includes installation components 300. The motion interactive video projection system 500 may include a housing 510 that may include one or more of the hardware components 100. An aperture 520 may be included, and the aperture 520 may allow one or more internal projectors or cameras to project or capture an image. For example, an internal projector may project an interactive scene or a distortion-compensating calibration pattern. The motion interactive video projection system 500 may be provided without an internal projector, and the aperture 520 may be used by an internal camera to capture image or video. For example, a motion interactive video projection system 500 may be provided without an internal projector, and may be configured to provide a video output to various external projectors, such as may already be present in a home theatre room of a house or a conference room of a business. The aperture 520 may provide one or more optics distortions or filters. For example, the aperture 520 may include a passive or active IR filter, and the IR filter may reduce light below or above the infrared spectrum. The housing 510 may include one or more additional light emitters or detectors 525, such as an IR emitter/detector. The housing 510 may include one or more buttons, switches, LCD touchscreens, or other hardware controls, such as a power switch 530. To simplify interaction and control of the motion interactive video projection system 500, the housing 510 may include hardware controls corresponding to buttons on the dedicated or software remote. A power supply 535 may be attached to housing 510, or the device may receive power from an internal, rechargeable power source. The housing 510 may also include one or more connectors, such as audiovisual connectors for external displays or projectors, wired network connectors, USB ports, memory card ports, or other peripheral connectors. The housing 510 may also include one or more internal wireless adapters, such as for Wi-Fi®, Bluetooth®, near-field communication (NFC), IR communication, or other wireless communication.

The motion interactive video projection system 500 may include a base 540. The base 540 may be mounted on a floor, wall, ceiling, table, or other surface, or the housing 510 may be mounted directly on a surface. The house 510 or base 540 may be secured to a surface using screws, suction cups, or other means. The housing 510 may be attached to the base 540 using screws or other fasteners, or the housing 510 may be removably attached to the base 540 using a quick-attach device or other removable connection. In other embodiments, the base 540 may be weighted to allow the motion interactive video projection system 500 to be simply set on a horizontal surface, such as a table.

The base 540 may allow the housing 510 to be reoriented vertically or horizontally, and the connection between the base 540 and the housing 510 may hold the housing in a fixed orientation. Orientation of the housing 510 with respect to the base 540, in some embodiments, may be performed manually. However, in other embodiments, orientation of the housing 510 with respect to the base 540 is adjustable by a powered motor. The powered motor may be activated in response to input received via a remote control or via the motion detection algorithms of the motion interactive video projection system 500.

One or more internal sensors may be used to detect orientation or movement of the housing 510, such as an accelerometer, gyroscope, or other sensor. Detection of orientation may be used for calibration, where calibration allows for correction of a distortion caused by projecting entertainment content onto a surface that is not perpendicular to the aperture 520. For example, projecting an image from the floor onto a wall will cause a trapezoidal distortion (e.g., keystone distortion), where the top of the image appears wider than the bottom of the image. The motion interactive video projection system 500 may use the detected orientation to determine the surface onto which the entertainment content is being projected and what amount of distortion correction to apply. For example, if the motion interactive video projection system 500 detects an orientation that corresponds to pointing the aperture 520 forty-five degrees above the ground, the motion interactive video projection system 500 may determine that the entertainment content is being projected onto a nearby wall, and may correct for distortion corresponding to a forty-five degree angle.

Additional distortions may be detected and corrected using various means. For example, a horizontal trapezoidal distortion may occur if the aperture 520 is pointing to the left or right of a line perpendicular with a projection surface. This horizontal distortion may be detected using a combination of orientation and rotation sensors in the housing 510 and in the base 540, and the motion interactive video projection system 500 may calculate the horizontal distortion as a function of the difference between the orientation of the housing 510 and the base 540. The distortion of the projection may also be corrected using an active feedback loop between the camera and the projection. For example, a camera may capture an image of the projection, compare the captured image to the original entertainment content source, and the motion interactive video projection system 500 may detect and correct for any distortion. As another example, an IR emitter may project a distortion-detection pattern (e.g., points, lines, grids, or other patterns) onto the projection surface, and an IR camera may capture an image of the projected pattern, compare the captured image to the original pattern, and the motion interactive video projection system 500 may detect and correct any distortion.

The distortion mitigation techniques may be applied to edge-blending between two or more motion interactive video projection systems 500. If two or more motion interactive video projection systems 500 are used to project a contiguous image, the distortion mitigation techniques may be used to detect and correct distortion and overlap for the projection from each motion interactive video projection system 500. For example, the entertainment content source and an IR distortion-detection pattern may be split vertically and projected by separate motion interactive video projection systems 500, and an IR camera may be used to detect and correct for any distortion or overlap between the two projections. Using this edge-blending technique, motion interactive video projection systems 500 may be configured in a three-by-one widescreen format, a two-by-two enlarged screen format, or any other combination of multiple motion interactive video projection systems 500. Two or more motion interactive video projection systems 500 may split a projection and perform this edge-blending technique by communicating between or among the motion interactive video projection systems 500, such as by using Wi-Fi, Bluetooth®, near-field communication (NFC), IR communication, or other communication methods. The splitting and edge-blending may also occur at the source of the entertainment content. For example, two motion interactive video projection systems 500 streaming video content may provide distortion-detection pattern data to the video streaming provider via the internet, and the video streaming provider may process the data and provide separate video streams that are corrected for distortion and edge-blending.

FIGS. 6A-6D are various views of a motion interactive video projection system 600, according to an embodiment. The motion interactive video projection system 600 may be used as an alternative to or in addition to a standard ceiling light fixture that includes installation components 300, or may be used as an alternative to or in addition to the motion interactive video projection system 500.

Figure 6A:
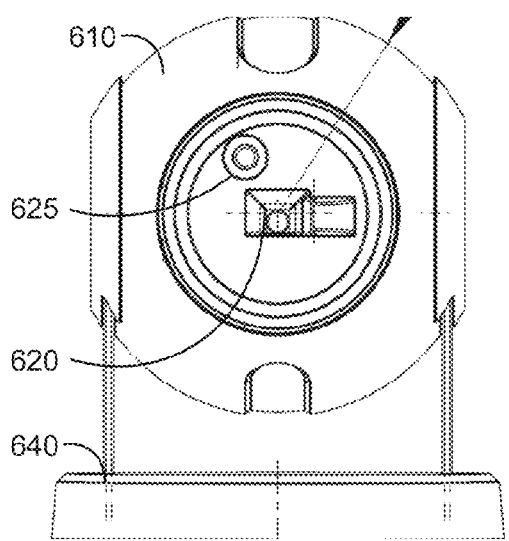
FIGS. 6A-6D are various views of a motion interactive video projection system, according to an embodiment.
Figure 6B:
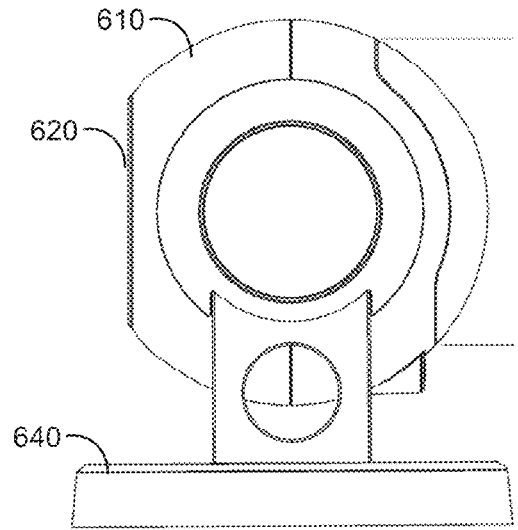
Figure 6C:
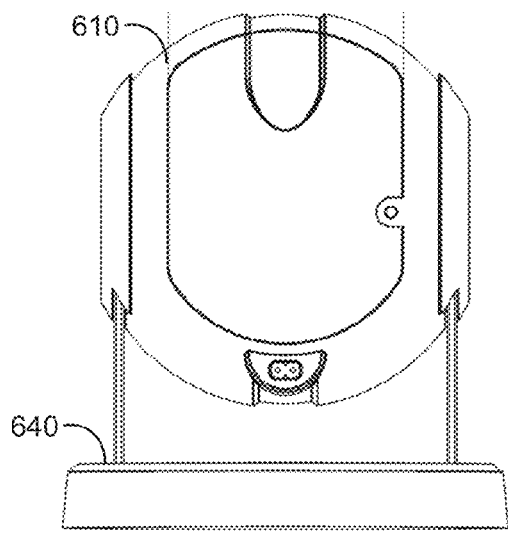
Figure 6D:
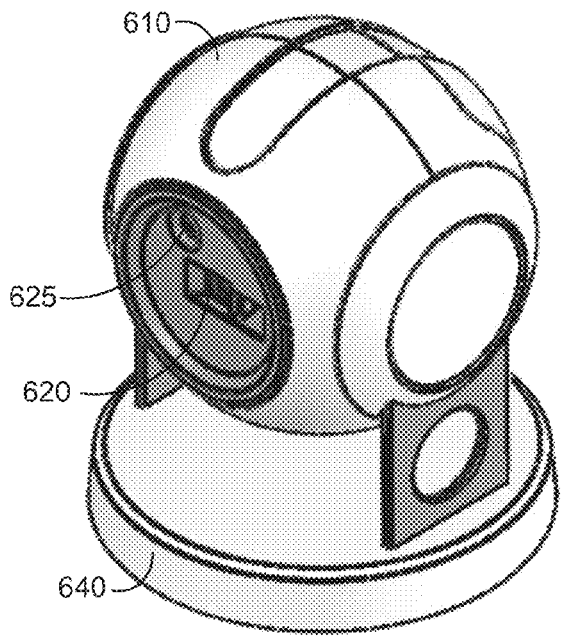

FIG. 6A shows a front view of the motion interactive video projection system 600, FIG. 6B shows a view from the right side, FIG. 6C shows a view from the top, and FIG. 6D shows a perspective view. The motion interactive video projection system 600 may include a housing 610 that may include one or more of the hardware components 100. An aperture 620 may be included, and the aperture 620 may allow one or more internal cameras to capture an image or video. The motion interactive video projection system 600 may not include an internal projector, and may be configured to provide a video output to various external projectors, such as may already be present in a home theatre room of a house or a conference room of a business. The aperture 620 may provide one or more optics distortions or filters. For example, the aperture 620 may include a passive or active IR filter, and the IR filter may reduce light below or above the infrared spectrum. The housing 610 may include one or more additional light emitters or detectors 625, such as an IR emitter/detector. The housing 610 may also include one or more connectors, such as audiovisual connectors for external displays or projectors, wired network connectors, USB ports, memory card ports, or other peripheral connectors. The housing 610 may also include one or more internal wireless adapters, such as for Wi-Fi®, Bluetooth®, near-field communication (NFC), IR communication, or other wireless communication.

The motion interactive video projection system 600 may include a base 640. The base 640 may be mounted on a floor, wall, ceiling, table, or other surface, or the housing 610 may be mounted directly on a surface. The house 610 or base 640 may be secured to a surface using screws, suction cups, or other means. The base 640 may be weighted to allow the motion interactive video projection system 600 to be simply set on a horizontal surface, such as a table.

The base 640 may allow the housing 610 to be reoriented vertically or horizontally, and the connection between the base 640 and the housing 610 may hold the housing in a fixed orientation. Orientation of the housing 610 with respect to the base 640, in some embodiments, may be performed manually. However, in other embodiments, orientation of the housing 610 with respect to the base 640 is adjustable by a powered motor. The powered motor may be activated in response to input received via a remote control or via the motion detection algorithms of the motion interactive video projection system 600. As described above with respect to the standalone interactive projection effect and entertainment system 500, one or more internal sensors may be used to detect orientation or movement of the housing 610, and detection of orientation may be used for calibration, where calibration allows for correction of a distortion caused by projecting entertainment content onto a surface that is not perpendicular to the aperture 620.

Figure 7:
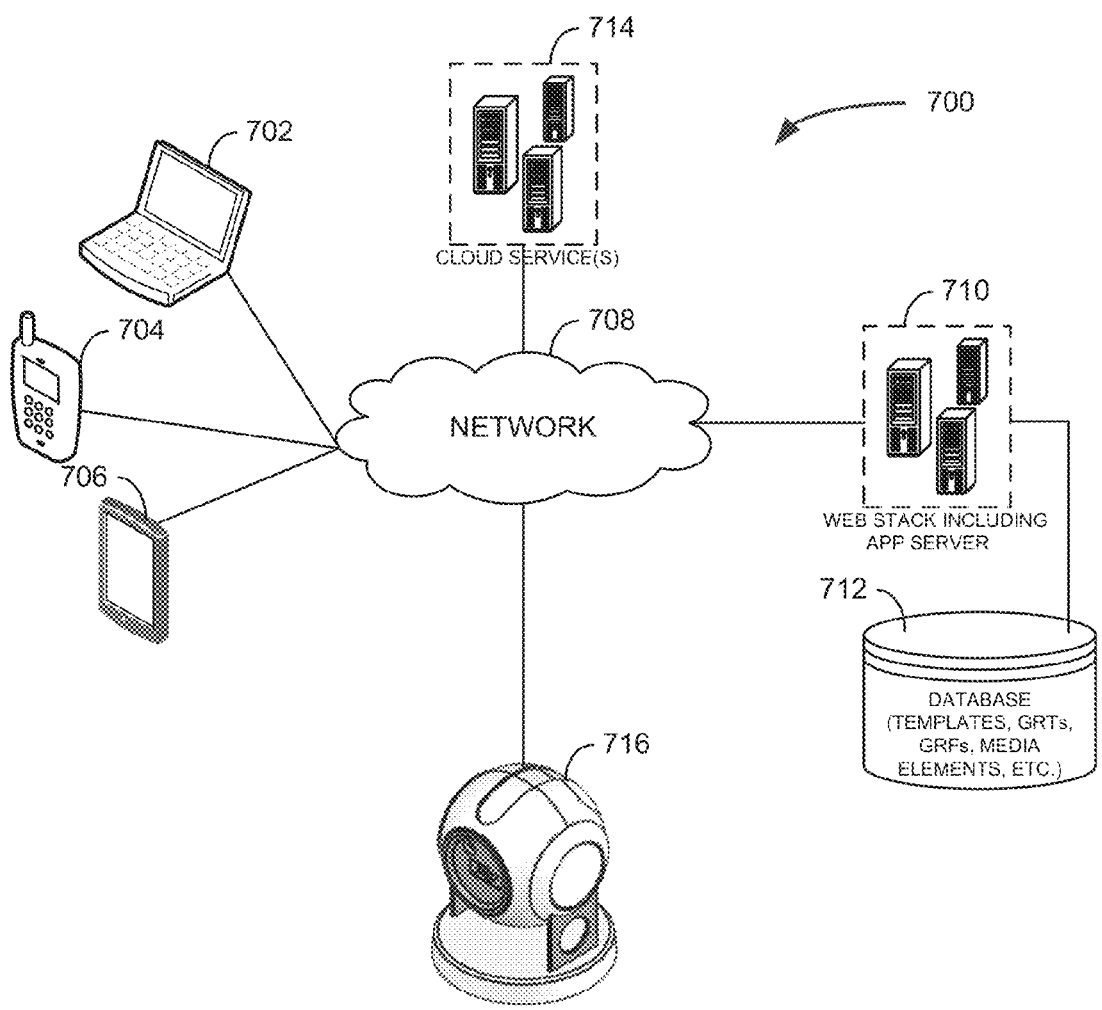
FIG. 7 is a logical architecture diagram of a computing environment according to an embodiment.

FIG. 7 is a logical architecture diagram of a computing environment 700 according to an embodiment. The computing environment 700 is an example of a networked environment within which content generation for motion interactive video projection systems may be simply created based on templates through one or more of dedicated websites, mobile device apps, and thick or thin client applications.

The computing environment includes various client computing devices. The client computing devices may include a plurality of each of personal computers 702, smartphones 704 and tablets 706 among other mobile devices, a motion interactive video projection system 716, and other computing devices. Each of these client computing devices is typically connected to a network 708, such as the Internet. Also connected to the network 708 are computing assets of an entity hosting a system 710 allowing for content generation for motion interactive video projection systems. Such a system 710 generally is a web stack including an application server on which software executes to request and receive user input via the network 708, generate previews of motion interactive content, and to publish motion interactive content. The motion interactive content may be published to a motion interactive video projection system 716, a client device or removable storage device connected thereto, a hosted cloud service 714, a network storage such as a database 712, and the like.

In a typical embodiment, a user of a client computing device provides input with regard to content to be generated or customized for use on a motion interactive video projection system 716. The input may identify a preexisting interactive graphical rendering template (GRT) from which to base the content to be generated or customized. A GRT is a template that generally includes media containers that are to be populated with user provided media elements, such as 2D or 3D images and animations, videos, avatars, sprites, and the like. The media elements may also include music and other renderable audio files and data. Media elements may be uploaded to the system 710 for storage in the database 712 directly from the client computing device. In some embodiments, media elements may be provided as a reference to a cloud or other network resource, such as an image posted to a social media platform (e.g., Facebook®, Flickr®, Twitter®, etc.), a music subscription or hosting service, a video subscription or hosting service, and the like.

A GRT also typically includes variables that allow a user to customize various elements thereof. For example, a user may specify an aspect ratio for presentation, a resolution such as in a number of pixels-per-inch or as pixel width by pixel-height, and a shape of a display area to be projected, such as a square, oval, star, triangle, and other shapes. A number of motion interactive video projection systems 716 to be utilized in presenting the desired output and how and where images are to be blended between multiple motion interactive video projection systems. Additionally, input may be received with regard to specific assets within the GRT, such as with regard to size, rotation, speed, coloring, images, text and drawings therein or on specific assets, lighting and texture variables, and whether to present all or certain objects in two-dimensional or three-dimensional form. Users may also choose or provide motion reactive and non-motion reactive assets from an online asset library, from a hosted or cloud storage location, or as may be uploaded from a computer. Additionally, a user may specify how certain assets or element of the GRT are to respond to motion, such as a reaction speed, color or lighting change, an angle of reaction, to make the asset visible or invisible, and other such properties. Some embodiments may also allow users to add custom code to define how certain elements react to motion.

Once a user has tailored a GRT to an acceptable form, the user may preview the GRT. The preview will be generated utilizing a motion interactive engine that is tailored to an input mode of the client type, such as a mouse of touch screen or mouse of a personal computer or touch input of a mobile device. The content of the preview is transmitted by the system 710 over the network 708 to the users computing device. The user may interact with the preview on the computing device and choose to make more modifications or to be finished. When finished, the user may choose to publish the tailored GRT as a graphical rendering file (GRF) that is consumable by the motion interactive video projection system 716.

A GRF is a file consumable by the motion interactive video projection system 716. The GRF may be a file renderable within a player program or plugin present on the motion interactive video projection system 716 or may include all instructions need to allow the motion interactive video projection system 716 to generate and project a rendering. In some embodiment, the GRF is .UNITY file, a .SWF file, or another file type providing similar capabilities as may be chosen based on requirements of or preferences for a specific embodiment. In some embodiments, a GRF file may be generated by compiling a GRT and the received input to generate the GRF, which may actually be a plurality of files, that is executable on the motion interactive video projection system 716.

A GRF file, when created, may be published or stored to the database 712, one or more cloud services 714, an online marketplace from which other users may purchase or otherwise download the GRF, stored to a client computing device, pushed tone or more motion interactive video projection systems 716, among other locations.

Figure 8:
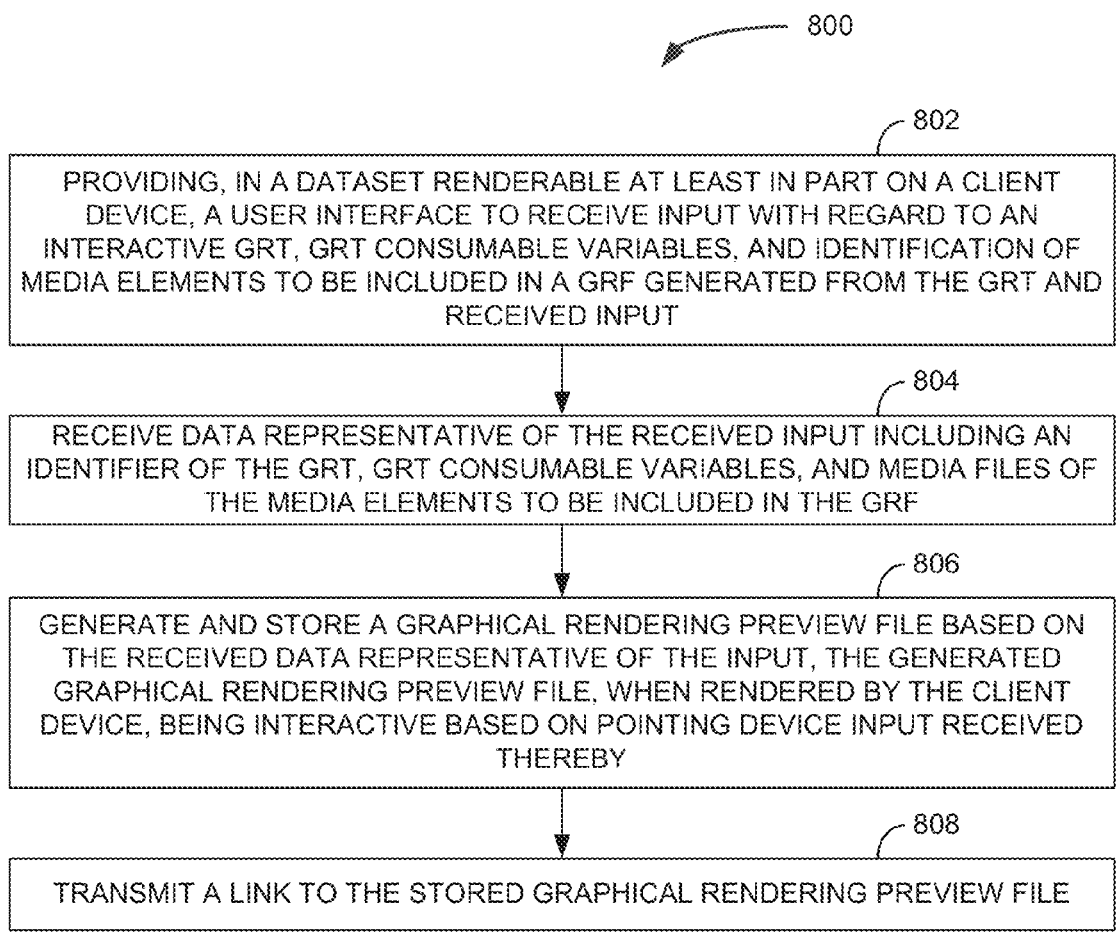
FIG. 8 is a block flow diagram of a method, according to an example embodiment.

FIG. 8 is a block flow diagram of a method 800, according to an example embodiment. The method 800 is an example of a method that may be performed in whole or in part on a system 710 as illustrated and described with regard to FIG. 7 to generate a GRF based on a GRT and user input.

The method 800 includes providing 802 a user interface to receive input with regard to a GRT, GRT consumable variables, and identification of media elements to be included in a GRF generated from the GRT and received input. The method 800 further includes receiving 804 data representative of the received input including an identifier of the GRT, GRT consumable variables, and media files of the media elements to be included in the GRF. The method 800 may then generate 806 and store a graphical rendering preview file based on the received data representative of the input. The generated graphical rendering preview file, when rendered by the client device, is interactive based on pointing device input received thereby, such as from a mouse, touchpad, or touch screen. The method 800 may then transmit 810 a link to the client, such as a hyperlink or other network address, from which the stored graphical rendering preview file may be retrieved. In some embodiments, the preview may simply be provided to the client device.

Some embodiments of the method 800 further include receiving a publish command to publish a GRF based on the received data representative of the input. The method may then generate and store a GRF based on the received data representative of the input. The GRF may be renderable by a motion interactive video projection system and be user interactive based on motion sensed by the motion interactive video projection system.

Figure 9:
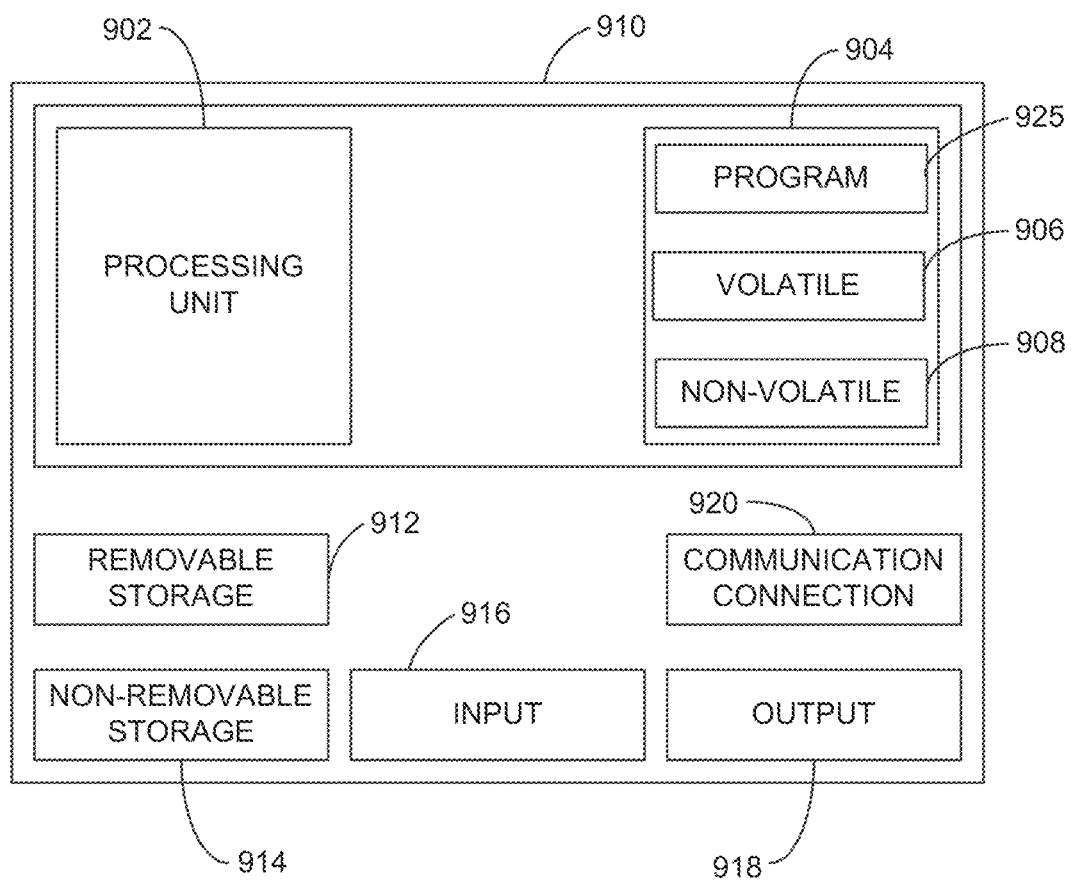
FIG. 9 is a block diagram of a computing device, according to an example embodiment.

FIG. 9 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. In some embodiments, the computing device of FIG. 9 is an example of a client device that may invoke the method 800 of FIG. 8 over a network. In other embodiments, the computing device is an example of a computing device that may be included in or connected to a motion interactive video projection system, as described elsewhere herein. In some embodiments, the computing device of FIG. 9 is an example of one or more of the personal computer 702, smartphone 704, tablet 706, and the various servers within the computing environment 700 of FIG. 7.

One example computing device in the form of a computer 910, may include a processing unit 902, memory 904, removable storage 912, and non-removable storage 914. Although the example computing device is illustrated and described as computer 910, the computing device may be in different forms in different embodiments. For example, the computing device may instead be a smartphone, a tablet, or other computing device including the same or similar elements as illustrated and described with regard to FIG. 9. Further, although the various data storage elements are illustrated as part of the computer 910, the storage may also or alternatively include cloud-based storage accessible via a network, such as the Internet.

Returning to the computer 910, memory 904 may include volatile memory 906 and non-volatile memory 908. Computer 910 may include—or have access to a computing environment that includes a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The input 916 may include one or more of a touchscreen, touchpad, mouse, keyboard, camera, and other input devices. The computer may operate in a networked environment using a communication connection 920 to connect to one or more remote computers, such as database servers, web servers, and other computing device. An example remote computer may include a personal computer (PC), server, router, network PC, a peer device or other common network node, or the like. The communication connection 920 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 902 of the computer 910. A hard drive (magnetic disk or solid state), CD-ROM, and RAM are some examples of articles including a non-transitory computer-readable medium. For example, various computer programs 925 or apps, such as one or more applications and modules implementing one or more of the methods illustrated and described herein or an app or application that executes on a mobile device or is accessible via a web browser, may be stored on a non-transitory computer-readable medium.

Since various modifications can be made to the various embodiments as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method comprising:
providing, via a network interface device in a dataset renderable at least in part on a client device, a user interface to receive input with regard to an interactive graphical rendering template (GRT), GRT consumable variables, and identification of media elements to be included in a graphical rendering file (GRF) generated from the GRT and received input;
receiving, via the network interface device, data representative of the received input including an identifier of the GRT, GRT consumable variables, and media files of the media elements to be included in the GRF;
generating and storing a graphical rendering preview file based on the received data representative of the input, the generated graphical rendering preview file, when rendered by the client device, being interactive based on pointing device input received thereby; and transmitting, via the network interface device, a link to the stored graphical rendering preview file.

2. The method of claim 1, further comprising:
receiving, via the network interface device, a publish command to publish a GRF based on the received data representative of the input;
generating and storing a GRF based on the received data representative of the input, the GRF renderable by a motion interactive video projection system and user interactive based on motion sensed by the motion interactive video projection system.

3. The method of claim 2, further comprising:
transmitting, via the network interface device, the GRF to a motion interactive video projection system.

4. The method of claim 2, wherein storing the GRF includes transmitting the GRF to the client device from which the GRF is to be transferred to a motion interactive video projection system.

5. The method of claim 2, wherein the GRF is one or more files each of a file format consumable by a motion interactive video projection system in providing a projected interactive user experience.

6. The method of claim 1, wherein the dataset renderable at least in part on the client device includes data renderable within a web browser of the client device which receives the input of and provides the data which is received that is representative of the received input.

7. The method of claim 1, wherein the dataset renderable at least in part on the client device includes data renderable within a client device application.

8. The method of claim 7, wherein the client device is a mobile device.

9. The method of claim 1, wherein receipt of a media file includes receiving an identifier of a media file stored by a network accessible service, the method further comprising:
retrieving, via the network interface device, the media file from the network accessible service based on the identifier of the media file.

10. The method of claim 1, wherein the GRT consumable variables of the received input includes at least one of:
data defining a number of displays on which a GRF is to be presented and edge-blending variables defining where seams between displays are to be created;
data identifying elements of the GRT and whether they are to be motion reactive;
data defining at least one of a size, rotation orientation, coloring, speed, and behavior of a GRT element as populated based on a media file; and
a reaction variable of a GRT element identifying how the GRT element is to respond to one or more identified inputs.

11. The method of claim 10, wherein receiving data representative of the received input further includes receiving executable code to be included in a GRF when created from the GRT.

12. A non-transitory computer readable medium, with instructions stored thereon, which when executed by at least one processor of a computing device, causes the computing device to perform a method comprising:
providing, via a network interface device in a dataset renderable at least in part on a client device, a user interface to receive input with regard to an interactive graphical rendering template (GRT), GRT consumable variables, and identification of media elements to be included in a graphical rendering file (GRF) generated from the GRT and received input;
receiving, via the network interface device, data representative of the received input including an identifier of the GRT, GRT consumable variables, and media files of the media elements to be included in the GRF;
generating and storing a graphical rendering preview file based on the received data representative of the input, the generated graphical rendering preview file, when rendered by the client device, being interactive based on pointing device input received thereby; and
transmitting, via the network interface device, a link to the stored graphical rendering preview file.

13. The non-transitory computer readable medium of claim 12, the method further comprising:
receiving, via the network interface device, a publish command to publish a GRF based on the received data representative of the input;
generating and storing a GRF based on the received data representative of the input, the GRF renderable by a motion interactive video projection system and interactive user interactive based on motion sensed by the motion interactive video projection system.

14. The non-transitory computer readable medium of claim 13, wherein the GRF is one or more files each of a file format consumable by a motion interactive video projection system in providing a projected interactive user experience.

15. The non-transitory computer readable medium of claim 12, wherein the dataset renderable at least in part on the client device includes data renderable within a web browser of the client device which receives the input of and provides the data which is received that is representative of the received input.

16. The non-transitory computer readable medium of claim 12, wherein the dataset renderable at least in part on the client device includes data renderable within a client device application.

17. The non-transitory computer readable medium of claim 16, wherein the client device is a mobile device.

18. The non-transitory computer readable medium of claim 12, wherein receipt of a media file includes receiving identifiers of a plurality of media files stored by at least one network accessible service, the plurality of media files including at least one of each of image files, video files, and audio files, the method further comprising:
retrieving, via the network interface device, each media file from respective network accessible services based on the identifier of the respective media file.

19. The non-transitory computer readable medium of claim 12, wherein the GRT consumable variables of the received input includes at least one of:
data defining a number of displays on which a GRF is to be presented and edge-blending variables defining where seams between displays are to be created;
data identifying elements of the GRT and whether they are to be motion reactive;
data defining at least one of a size, rotation orientation, coloring, speed, and behavior of a GRT element as populated based on a media file; and
a reaction variable of a GRT element identifying how the GRT element is to respond to one or more identified inputs.

20. The non-transitory computer readable medium of claim 19, wherein receiving data representative of the received input further includes receiving executable code to be included in a GRF when created from the GRT.

* * * * *